United States Patent [19]
Gold

[11] Patent Number: 5,647,086
[45] Date of Patent: Jul. 15, 1997

[54] SPARE WHEEL CARRIER-MOUNTED REAR WINDOW WIPER

[76] Inventor: Peter Gold, 465 N. Wood Rd., Rockville Centre, N.Y. 11570

[21] Appl. No.: 735,008

[22] Filed: Oct. 22, 1996

[51] Int. Cl.[6] ................ B60S 1/58; B60S 1/04
[52] U.S. Cl. .......... 15/250.31; 15/250.3; 15/250.001; 15/250.19; 296/96.17; 224/42.12; 224/42.21; 414/463
[58] Field of Search ............... 15/250.19, 250.3, 15/250.31, 250.1, 250.001, 250.16; 224/42.12, 42.21; 296/37.2, 96.17, 96.15; 414/463, 465, 466

[56] References Cited

U.S. PATENT DOCUMENTS

| | | | |
|---|---|---|---|
| 3,978,542 | 9/1976 | Van Eekelen et al. | 15/250.3 |
| 4,316,303 | 2/1982 | Penn | 15/250.3 |
| 4,353,111 | 10/1982 | Gallitzendorfer et al. | 15/250.3 |
| 5,410,774 | 5/1995 | Adams | 15/250.31 |

*Primary Examiner*—Gary K. Graham
*Attorney, Agent, or Firm*—Myron Amer PC

[57] ABSTRACT

A van rear window wiper that is mounted on the van spare wheel carrier in which the position of the spare wheel carrier closed against the tailgate of the van establishes contact of the wiper blade, under spring urgency, against the van rear window incident to the wiper providing window-wiping service.

1 Claim, 1 Drawing Sheet

SPARE WHEEL CARRIER-MOUNTED REAR WINDOW WIPER

BACKGROUND OF THE INVENTION

The present invention relates generally to improvements for a van rear window wiper, the improvements more particularly obviating the mounting of the wiper motor in connected relation to the window which requires drill holes for connecting means in the window and which undermines its structural stability, and wherein the improvements otherwise result in a better mounting for the wiper.

EXAMPLE OF THE PRIOR ART

A rear window wiper avoiding a threaded connection to the window per se is already known, being described and illustrated in U.S. Pat. No. 4,316,303 for "Auxiliary Windshield and Window Wiper" issued to Silas Penn on Feb. 23, 1982 and is of a type which is portable and consequently positionable at a site of operation in adjacent relation to the rear window. In U.S. Pat. No. 4,316,303 the motor of the wiper is positioned on the vehicle body panel above the window and thusly avoids drill holes or the like in the window, but otherwise is of nominal utility being, for example, unsuitable for a rear window that pivots open incident to obtaining access to the interior of a vehicle of the van-type which has a pivoting, rather than a stationary, rear window.

SUMMARY OF THE INVENTION

Broadly, it is an object to provide a more utilitarian rear window wiper, i.e. for movable as well as stationary rear windows, thereby overcoming the foregoing and other shortcomings of the prior art.

More particularly, it is an object to provide an operable wiper for a popularly used van having a window that pivots open and also has a spare wheel carrier, in which the operational mode of the carrier is used to advantage in providing optimum mounting of the wiper, all is will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

DETAILED DESCRIPTION OF THE PREFERRED EMBODIMENT

Figure 1:
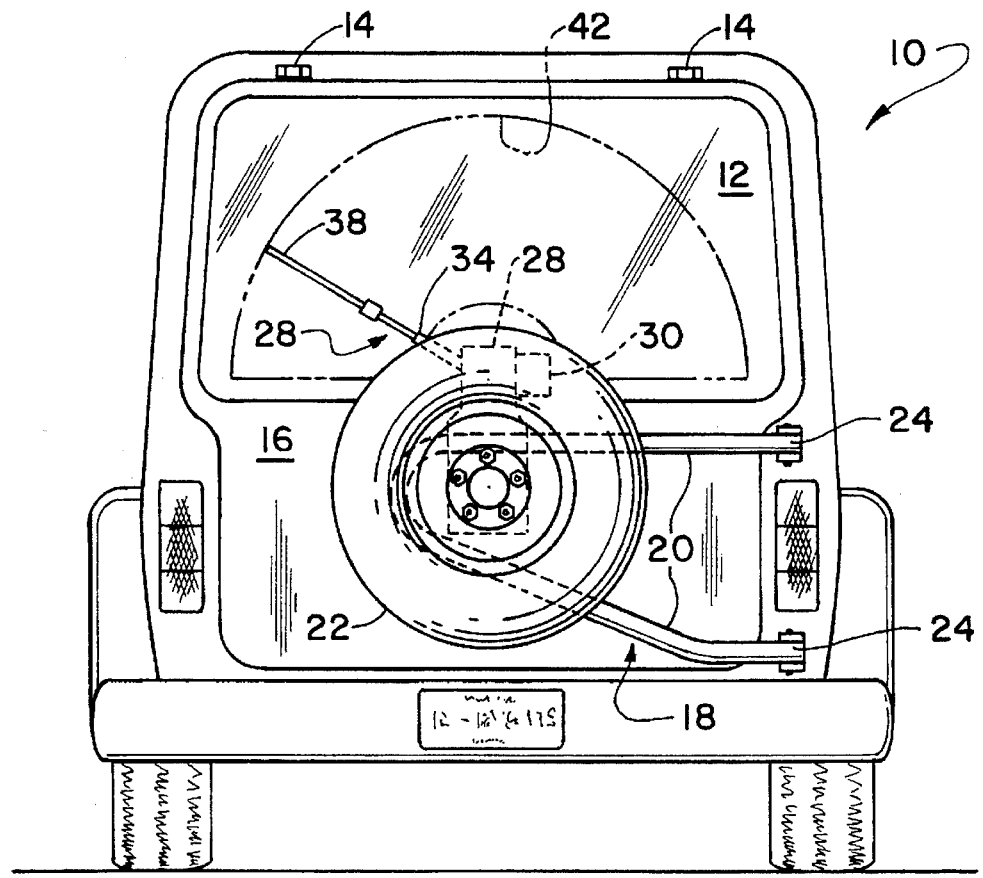
FIG. 1 is a rear elevational view of a van having an improved rear window wiper in accordance with the present invention.
Figure 2:
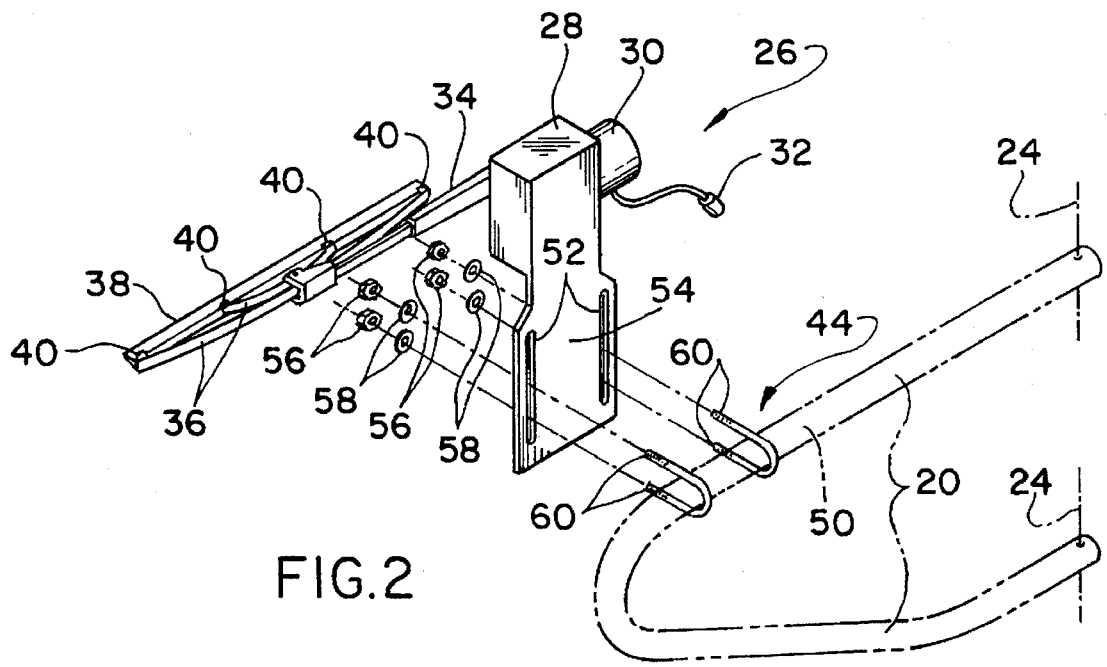
FIG. 2 is an isolated exploded view of the wiper illustrating the manner in which the wiper is mounted on a van spare wheel carrier, shown in phantom.

A known van, in popular use, generally designated 10 in FIG. 1, has a rear closure for its interior consisting of an upper positioned window 12 which from its closed position opens in an ascending pivotal traverse about hinges 14, and a lower positioned tailgate 16 either separately adapted to open (not shown) or, as illustrated in FIG. 1, is an integral lower extension of the window 12. Use is also made of a known spare wheel carrier 18, including a wheel-supporting bracket 20 on which the spare wheel 22 is appropriately mounted, and which bracket 20 has ends pivotally mounted, as at 24, adjacent an end of the tailgate 16 so as to partake of a pivotal traverse from a position of movement closed against the tailgate 16 into clearance positions removed therefrom.

Heretofore, a rear window wiper was mounted to provide wiping service thereto either along an upper edge of the window 12, or along an upper edge of the tailgate 16 just below the window 12, neither of which position being optimum because the mounting on the window 12 requires drill holes therein for connecting structure which weakens the window, and the mounting on the tailgate 16 subjects the wiper to possible damage caused by contact therewith during the opening and closing pivotal traverses of the spare wheel carrier 18.

Underlying the present invention is the recognition that the noted shortcomings are overcome by avoiding the mounting on the window 12 and substituting the spare wheel carrier for the tailgate as the support for the wiper since movement of the wiper along with the spare wheel carrier is less likely to cause damage to the wiper than movement of the carrier in relation to a stationary wiper mounted on the tailgate. To this end of effectuating the substitution noted, use is advantageously made of the pivotal traversing operational mode of the spare wheel carrier 18 to position the wiper, as needed, in adjacent relation to the window 12, all as will now be explained in detail.

An operational wiper, generally designated 26, will be understood to be embodied in an article of manufacture of a type having a pivotal traversing mechanism 28 powered by a motor 30 which is electrically connected via a connector 32 to a van battery. An arm 34 is appropriately operably connected to the mechanism 28 and includes leaf spring means 36 to which the wiper blade 38 is attached, as at 40, said wiper 26 having a known operational mode in which the blade 38 under the urgency of the leaf spring means 36 is disposed in contact against the window 12 and actuated in opposite direction pivotal traverses, denoted at 42, which clears the exterior surface of window 12 of rain, snow and the like thereby providing the driver with necessary visibility through the window 12. Wiper articles of manufacture of the nature described are well-known, being exemplified by the portable vehicle window wiper of U.S. Pat. No. 5,410,774 issued to Macie G. Adams on May 2, 1995 and the auxiliary windshield and window wiper of U.S. Pat. No. 4,316,303 issued to Silas Penn on Feb. 23, 1982.

In accordance with the present invention, the selected site of operation of the wiper 26 is on the spare wheel carrier bracket 20 at a location therealong, as at 44, which is coincident with a central location along a lower edge of the window 12, as at 46, and at this site of operation it will be understood that contact is established between the blade 38 and the exterior surface of the window 12 under the urgency of the leaf spring means 36. To facilitate the selection of the desired site of operation 44, 46 of the wiper 26, U-bolts 48 slidable along the upper bracket bar 50 of the space wheel carrier 18 are projected through vertical slots 52 of a depending plate 54 of the housing of mechanism 28 and held in place by nuts and washer means 58 threadably engaged to threaded ends 60 of the U-bolts 48, the horizontal sliding movement along the bracket bar 50 in conjunction with vertical movement along the slots 52 cooperating to provide two-direction movement adjustments in the positioning of the wiper 26 at the site of operation 44, 46.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In a van which includes a van rear closure mounted thereto, a rear spare wheel carder pivotally mounted thereto, a battery, and a rear window wiping means powered by said battery, said wiping means including a wiper blade adapted for pivotal oscillation, said rear closure having a tailgate and a rear window, said rear spare wheel carder mounted adjacent an end of said tailgate and movable between a closed position against said tailgate and clearance positions spaced from said tailgate, said spare wheel carrier extending along and adjacent to the rear window in the closed position, the improvement comprising;

said rear window wiping means including mounting means adjustably mounting said wiping means to said rear spare wheel carrier at a central location along a lower edge of said rear window, said blade of said rear window wiping means engaging a surface of said window when the carrier is in the closed position.

* * * * *